United States Patent
Dudley

[11] 4,018,108
[45] Apr. 19, 1977

[54] DEVICE FOR SETTING CIRCLE SAWS

[76] Inventor: Alex Dudley, 220 Edgewood Road, Lansing, Mich. 48910

[22] Filed: Aug. 4, 1975

[21] Appl. No.: 574,361

[52] U.S. Cl. .................................. 76/63; 76/73
[51] Int. Cl.² ................................. B23D 63/02
[58] Field of Search ...................... 76/62, 63, 73

[56] References Cited

UNITED STATES PATENTS

| 441,100 | 11/1890 | Huntsman | 76/62 |
| 824,996 | 7/1906 | Miller | 76/63 |
| 995,590 | 6/1911 | Flaherty | 76/63 |
| 2,336,761 | 12/1943 | Upright | 76/63 |
| 2,506,406 | 5/1930 | Yoos | 76/63 |
| 3,020,784 | 2/1962 | Daggett | 76/63 |

FOREIGN PATENTS OR APPLICATIONS

| 21,121 | 10/1908 | United Kingdom | 76/63 |

Primary Examiner—Al Lawrence Smith
Assistant Examiner—Nicholas P. Godici

[57] ABSTRACT

A setting apparatus for circular saws is described in which an elongated channel iron base is employed to carry both the setting device and the cooperating means. The channel iron base is of sufficient length to accomodate an open-end slidable box, said box supporting a fixed saw holding arbor; said slidable box being movable on said elongated channel iron base, and also longitudinally adjustable to position the peripheral edge of a circle saw of any size in proper relation to the edge of the anvil. The anvil is located at the right end of channel iron base and said slidable box being releasably lockable to the channel iron base at any point desired.

The right end of the elongated channel iron base is provided with two angle iron plates, welded or bolted in place, and positioned with sufficient width to accept a stress-proof metal bar arm equipped with a one-fourth inch tool bit as the striking element. The metal bar arm and the metal angle plates are bored to receive a bolt pivotally supporting said bar arm.

The extreme right end of elongated channel iron base has an elongated slot in which an eccentric throw is supported. The eccentric throw is drilled and threaded through it's center to receive a short threaded shaft on which it rocks, said shaft being equipped with a hex nut to receive the end of lever which actuates the eccentric throw, forcing the metal bar arm carrying the striking element to pressure each tooth as presented with sufficient force to uniformly and precisely set each tooth, and falling away of it's own weight when the operator releases the lever. The channel iron base carrying the setting apparatus and slidable box is releasably lockable to any work bench and is portable.

2 Claims, 4 Drawing Figures

DEVICE FOR SETTING CIRCLE SAWS

BACKGROUND

This invention relates to the improvement in apparatus for setting circle saws, and an effort to simplify this process in terms of skill required and time consumed, thus making it a more profitable business. There has been an increasing effort through the years to mechanize the sharpening and setting of saws. This has resulted in an increase in the time consumed and technical skill required, without improving the results.

A saw setting apparatus is disclosed in U.S. Pat. No. 3,020,784, in which a reversing spring lifting action is employed to operate a hammer type striking element as each tooth is set; such spring action and striking element being activated by operator depressing a foot pedal. Such a process would be fatiguing for the operator, and if all teeth are to be set in a precise and uniform manner, would require that each pressure of the pedal be uniform. It would be considerably exerting to stand on one foot and operate the pedal with the other foot for any length of time.

Accordingly, it is the object of my invention to provide a circle saw setting apparatus which is light in structure, simple and rapid in operation, and inexpensive to produce and maintain.

A further object is to provide a saw setting apparatus which does not require a great deal of skill or effort on the part of the operator.

Another object is to provide a saw setter, which, with the proper cooperating means, could be used for setting any saw tooth; speed and precision in this inflated market make it more profitable to restore a saw than to discard it.

A fourth object is to provide a setter which can be easily moved and set up wherever needed, i.e., construction sites, etc., and can be operated with ease and rapidity, thus extending the life and usefulness of a saw considerably.

BRIEF DESCRIPTION OF DRAWINGS

As seen in FIG. 1, the right end of the channel iron base is provided with two angle iron plates, positioned with sufficient width to accept a stress-proof metal bar arm equipped with a one-fourth inch high speed steel tool bit as the striking element. As shown, extreme right end of channel iron base has an elongated slot in which an eccentric throw is supported. The eccentric throw is threaded through it's center to receive a short threaded shaft on which it rocks; said shaft being equipped with a hex nut to receive the end of a lever which actuates the eccentric throw.

DESCRIPTION OF THE PREFERRED APPARATUS

Figure 1:
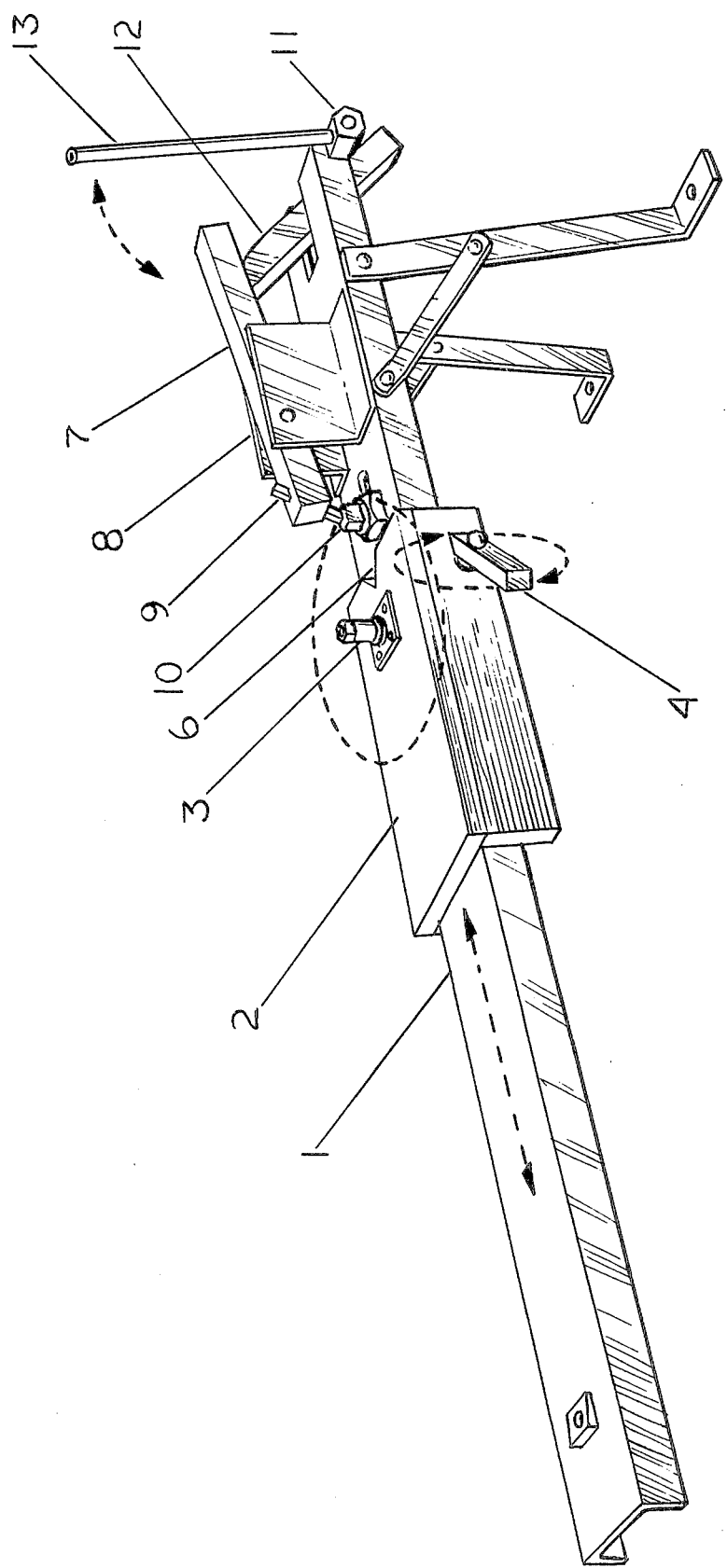
FIG. 1 is an overall view of my apparatus with a view of the setting device in operable relationship to the peripheral edge of a circle saw horizontally disposed on an arbor supported by a slidable open-end box, which box is adjustable longitudinally over the length of an elongated channel iron base of sufficient length to carry both the setting device and the saw holder, and releasably lockable thereon as size of saw to be set requires.

Referring to FIG. 1, the base of the setting apparatus is an elongated channel iron base 1 of sufficient length to carry the saw holding arbor 3, the anvil 10, and the setting device; the saw holding arbor 3 being supported on a slidable open-end box 2. Said arbor is a fixed arbor, equipped with several bushings, each bushing being a different size on each end for various size apertures, and being equipped with a nut, which nut may be tightened enough to secure the saw, but making it possible to turn the blade easily as each tooth is presented for setting. Th slidable box 2 is threaded to receive a bolt 4 below the level of the channel iron base 1 and said bolt 4 is fitted with clamps 5 and washers, etc., to releasably lock the slidable box 2 against further lateral movement after slidable box 2 carrying saw holding arbor 3 has been longitudinally adjusted to position the peripheral edge of the saw in operable relation to the edge of the anvil 10. The anvil 10 is a threaded, hardened, square post received from under the channel iron base 1 into a slot allowing room for adjustment of said anvil 10 to striking element 9; said anvil 10 being secured below channel iron 1 and above channel iron with nuts and washers, allowing for adjustment, including elevational adjustment to striking element 9. The radius of the head of the anvil 10 is such as to allow clearance of a set tooth so blade can easily be turned.

Figure 2:
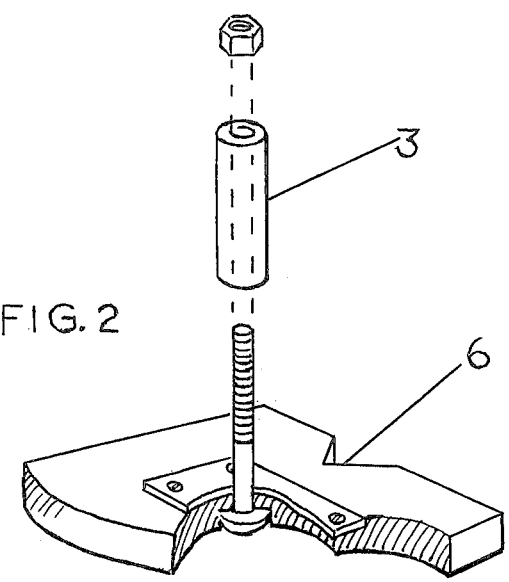
FIG. 2 is a detail of the arbor, showing the arrangement of the bushing and the nut which secures it. It also shows the notch allowing the slidable box to be brought in close proximity to the anvil, as is necessary in setting very small saws.
Figure 3:
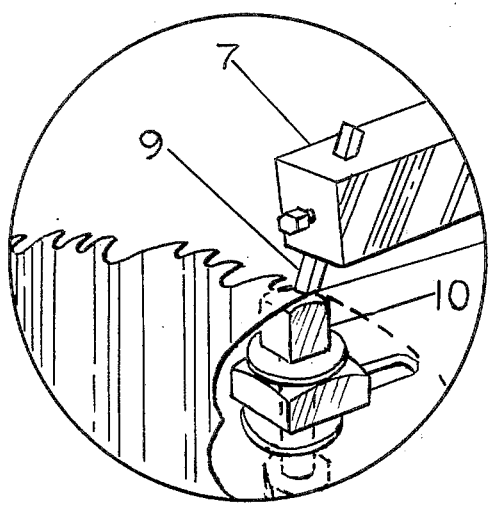
FIG. 3 is a view of the metal bar arm equipped with the tool bit which is secured in the metal bar arm with set screws. It also is a view of the detail of the anvil.

There is a notch 6 as shown in FIG. 2 which allows even a very small saw to be brought to close proximity with the anvil 10.

Figure 4:
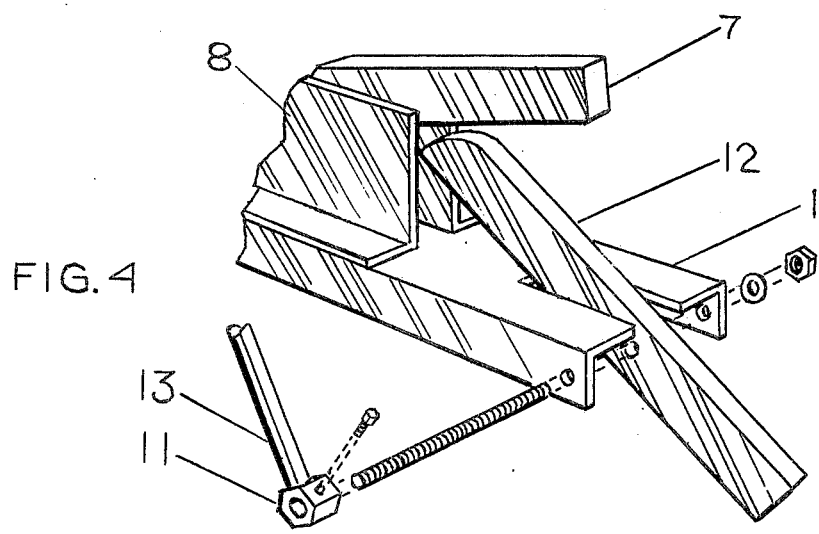
FIG. 4 is a drawing of the eccentric throw in the elongated slot at right end of channel iron, the shaft on which said eccentric throw rocks, and the lever which actuates the eccentric throw.

Again in FIG. 1 and also in FIG. 4, the arrangement of the setting device is shown. The right end of the elongated channel iron base 1 is provided with two angle iron plates 8 welded or bolted on base 1 with sufficient width to accept a stress-proof metal bar arm 7 equipped with one-fourth inch high speed steel tool bit 9 as the striking element; said tool bit 9 being set at a 45° angle in said metal bar arm 7 and secured with set screws. The metal bar arm 7 and the angle plates 8 are bored to receive a bolt pivotally supporting said metal bar arm 7.

FIG. 1 and FIG. 4 both illustrate an elongated slot at the extreme right end of channel iron base 1 in which an eccentric throw 12 is supported. Eccentric throw 12 is drilled and threaded through it's center to receive a short threaded shaft on which it rocks; said shaft being secured with a hex nut 11 said nut being drilled on all flats to receive the lever 13, which actuates the eccentric throw 12, forcing metal bar arm 7 to exert a six to one applied pressure of striking element 9 against anvil 10, and giving each tooth as presented a precise and uniform set. When lever 13 is released, eccentric throw 12 immediately releases metal bar arm 7 which arm falls away from saw tooth of it's own gravity weight, eliminating any need for spring action. As shown in FIG. 1, angle irons are bolted to channel iron base 1, making it releasably lockable to bench, and also making it portable.

In using my saw setting apparatus, the operator places a saw blade on the fixed arbor and selects a bushing of a size suitable for the aperture of the saw to be set, turning the nut just enough to secure the bushing, but allowing the blade to be turned. Operator then adjusts the slidable open-end box 2 longitudinally on the channel iron base 1, bringing the peripheral edge of the saw in operable relation with the anvil 10, and positioning the gullet of the tooth over the breaking point of the anvil, at which time the releasably lockable bolt 4 is secured, preventing further lateral movement of saw holding arbor. Operator then proceeds to turn the blade with his left hand and as every other tooth is presented he pushes the lever 13 with his right hand, actuating the eccentric throw 12 and setting each tooth with uniformity and precision, and with very little stress on operator.

After one side of the saw is set operator releases the nut on arbor 3, lifts the bushing, and flips the saw over, proceeding with the other side until all teeth are uniformly set.

What is claimed is:

1. A circular saw setting apparatus comprising, in combination:
    a. a bench supporting an elongated channel iron base, and means for locking said base to said bench;
    b. a slidable open-end box supporting a saw holding arbor, means for locking said slidable box at any required point on said channel iron base;
    c. an anvil received through a slot in said channel iron base, means for adjusting said anvil elevationally and longitudinally;
    d. means for securing a circular saw on said saw holding arbor, and means for adjusting the peripheral edge of said saw in operable contact with said anvil;
    e. two angle iron plates so spaced as to support between them a metal bar arm, means for pivotally supporting said bar arm between said plates;
    f. a tool bit set in a striking end of said bar arm and secured with set screws;
    g. an elongated slot in one end of said channel iron base sufficiently wide to support an eccentric throw, a threaded shaft pivotally supporting said eccentric throw in said slot;
    h. and means for activating said eccentric throw to thereby move said bar arm and thus said tool bit set against said anvil, said means being a hex nut on one end of said threaded shaft, said hex nut being drilled on all flats to receive a lever for activating said eccentric throw.

2. A circular saw blade setting apparatus comprising in combination, an elongated channel iron base, said base secured to a bench; said base carrying a slidable open-end box supporting a fixed saw holding arbor; means for securing said slidable box against lateral movement at any required point on said channel iron base, in cooperation with:
    a. an anvil received through a slot in said channel iron base, means for adjusting said anvil elevationally and longitudinally;
    b. two angle iron plates secured to said channel iron base, and so spaced as to support between them a pivotally supported metal bar arm;
    c. means equipping said metal bar arm with a high speed steel tool bit at a 45° angle in a striking end of said metal bar arm;
    d. an elongated slot at an end of said base, said slot receiving an eccentric throw, and means for supporting said eccentric throw comprising a short threaded shaft through said channel iron base and said eccentric throw;
    e. means for securing said short threaded shaft to said base, said means being a hex nut, said hex nut being bored on each flat to receive a lever for activating said eccentric throw, said eccentric throw forcing said bar arm carrying said tool bit to exert sufficient pressure on said anvil to uniformly set each saw tooth thus positioned between said tool bit and said anvil.

* * * * *